(12) United States Patent
Whitehead

(10) Patent No.: US 7,889,656 B2
(45) Date of Patent: Feb. 15, 2011

(54) BINNED DURATION FLOW TRACKING

(75) Inventor: Bradley James Whitehead, Kingston (CA)

(73) Assignee: Alcatel Lucent, Paris (FR)

( * ) Notice: Subject to any disclaimer, the term of this patent is extended or adjusted under 35 U.S.C. 154(b) by 1357 days.

(21) Appl. No.: 11/392,736

(22) Filed: Mar. 30, 2006

(65) Prior Publication Data

US 2007/0237079 A1  Oct. 11, 2007

(51) Int. Cl.
*G01R 31/08* (2006.01)
(52) U.S. Cl. .................................. 370/235; 370/392
(58) Field of Classification Search .............. 370/235, 370/252, 389, 392; 726/23
See application file for complete search history.

(56) References Cited

U.S. PATENT DOCUMENTS

| 7,584,507 | B1 * | 9/2009 | Nucci ........................... 726/23 |
| 7,624,447 | B1 * | 11/2009 | Horowitz et al. .............. 726/23 |
| 2006/0098585 | A1 * | 5/2006 | Singh et al. ................. 370/252 |
| 2010/0098081 | A1 * | 4/2010 | Dharmapurikar et al. ... 370/392 |

OTHER PUBLICATIONS

Whitehead, Binned duration flow tracking and symmetric conneciton detection, Jan. 2007.*
Estan et al, New directions in traffic measurement and accounting, Aug. 2002.*
Kumar et al, Space-coded bloom filter for efficient per flow traffic measurement, 2004.*
Singh et al, On scalable attack detection in the network, 2004.*
Duffield et al, "Estimating Flow Distributions from Sampled Flow Statistics", available at http://public.research.att.com~ duffield/papers/DLT03-lengths.pdf.

* cited by examiner

*Primary Examiner*—Aung S Moe
*Assistant Examiner*—Vinncelas Louis
(74) *Attorney, Agent, or Firm*—Kramer & Amado, P.C.

(57) ABSTRACT

Binned Duration Flow Tracking (BDFT) method tracks the duration of packet flows in a resource limited environment by storing packets identifying the beginning and the end of a flow in bins, with each bin covering an independent and arbitrary length of time. Bins are "aged" periodically, based on the range of time which the bin covers. A query as to the flow duration returns the bin number which that flow is in; the bin number is then translated into a range of time. Each bin is a counting bloom filter. The size of the bloom filters, range of the count, and number of hashes used are all parameters of the algorithm which affect memory usage, processing required, and accuracy.

20 Claims, 4 Drawing Sheets

BINNED DURATION FLOW TRACKING

FIELD OF THE INVENTION

The invention is directed to communication networks and in particular to tracking the duration of packet flows in such networks.

BACKGROUND OF THE INVENTION

A need has arisen for both the users and network operators to have a set of mechanisms to monitor network performance, detect router availability, and troubleshoot network congestion without introducing additional traffic on any communication network. This is especially relevant to Internet providers that must comply with SLAs (Service Level Agreements) that they provide to customers. As Internet architecture evolves, the SLAs now include requirements on the quality of service such as jitter, throughput, one-way packet delay, and packet loss ratio. Additionally, the need to monitor the network traffic is prevalent for the underlying Internet protocol enabling the World Wide Web. Accordingly, various types of mechanisms for network monitoring have been developed lately, as described next.

Active network performance monitoring systems are based on sending a series of special test packets or query packets to the underlying networks or routers, and analyzing the response with a specific purpose. Currently, most tools for active end-to-end QoS monitoring in IP networks are based on the traditional "ping" (i.e., ICMP echo and echo response messages) to measure the roundtrip delay between two hosts. Although these additional packets may provide information about the network performance, they do not provide information about the duration of the traffic flows.

Passive network performance monitoring mechanisms perform traffic analysis in a non-invasive way with respect to the observed networking environment. As a result, these mechanisms do not affect the performance of the network while doing the measurements and querying. A traditional such approach usually involves collecting the entire TCP/IP packet or packet header data and analyzing the collected information followed by off-line traffic characterization and modeling; flow start and stop time may also be recorded. However, this approach is infeasible at high traffic speeds, and also requires large amounts of memory and processing capacity.

Various examples of passive mechanisms have been implemented by certain entities. For example, Cisco offers the NetFlow traffic analyzer that identifies traffic flows based on IP source/destination addresses, protocol ID field, type of service field, and router port. Once identified, statistics can be collected for a traffic flow, and exported via user datagram protocol (UDP) when the flow expires. A NetFlow record contains information about flows that pass through the router and provides a digest of the communications showing hosts that were involved, services that were used, and how much data was exchanged.

As another example, Lucent Bell Labs has various research projects in traffic analysis, which are mainly concentrated on collection of TCP/UDP/IP packet headers and off-line traffic analysis, modeling and visualization.

Another method of collecting network statistics is described in "Estimating flow distributions from sampled flow statistics" Duffield et al, available at http://public.research.att.com/~duffield/papers/DLT03-lengths.pdf. This paper provides methods that use flow statistics formed from a sampled packet stream to infer the frequencies of the number of packets per flow in the unsampled packet stream. This is obtained by using statistical inference, and exploiting protocol level detail reported in flow records.

However, while the passive network performance monitoring mechanisms described above may provide information about the network performance, they do not provide information about the duration of the traffic flows. Generally, these mechanisms only track the length or size of flows (e.g. the number of packets), which is relatively easy to determine in a sampled environment, but they do not determine the flow duration; currently, the inventor is not aware of any reliable method for tracking flow duration.

As such, the current state of sampled network monitoring solutions remains basic, providing limited information to service providers. Much of the information which is currently not available, like flow duration, can be essential in tracking down anomalous activity in a network.

Tracking flow duration is particularly relevant for network vendors who wish to provide access to information on their high-end routers; they must therefore devise scalable and efficient algorithms to deal with the limited per-packet processing time available. Network operators can use flow duration information to implement cost saving measures, and detect high-cost network traffic such as point-to-point traffic. Detailed visibility into individual users and business applications using the global network is essential for optimizing performance and delivering network services to business users.

There is a need to provide a method of determining when a traffic flow was established with a high degree of accuracy for enabling network operators/providers to perform traffic engineering, particularly in networks with high-end routers, where the per-packet processing time is limited. To address this need the focus of the present invention is to create a method of tracking the duration of every flow in a sampled environment, while maintaining low resource usage.

SUMMARY OF THE INVENTION

It is an object of the invention to provide a method of measuring flows duration that alleviates totally or in part the drawbacks of the current network monitoring mechanisms.

It is another object of the invention to provide a method and system for accurately tracking duration of packet flows in a resource limited environment, which measurement is performed in real-time.

Advantageously, the method of the invention is designed to work in a resource limited environment while it provides accurate results; tests have shown over 99% accuracy has been achieved. Queries for the duration of a specified flow may be preformed in real-time, without any need for further processing of data. The system of the invention may be scaled to fit different levels of memory or processing capacity, by sacrificing the accuracy.

Still further, network operators can use the method of the invention for tracking the distribution of flow durations in a network with a view to detecting anomalies and to balance the traffic. As an example, a service provider may identify, let's say flows longer than 15 minutes and which comprise over 50% of the total bandwidth, and concentrate of identifying if there is a problem with such flows. Or, suspicious activities may be detected based on flows duration. For example, a flow that is using a moderate amount of bandwidth (2 Mbps) may not be suspicious if it has been active for 30 seconds, but could be, if it has been active for 45 minutes.

Knowing the flow duration also enables network monitoring software vendors to add features to their software, which will only work when accurate flow duration information is available from the router/network device.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

The Internet Protocol header carries several information fields, including the source and destination host address information. The header also includes 6 control bits (or flags) that are set according to the packet type. A SYN flag is set in a packet during the three-way handshake which establishes a TCP connection, and is used to synchronize sequence numbers of the packets in the respective flow. When a normal TCP connection starts, a destination host receives a SYN (synchronize/start) packet from a source host and sends back a SYN ACK (synchronize acknowledge). The destination host must then hear an ACK (acknowledge) of the SYN ACK before the connection is established. This is referred to as the "TCP three-way handshake."

A FIN flag is set in a packet during the graceful teardown of an existing connection, and is used to indicate that there is no more data from sender. RST flag is set to request reset of a connection.

Binned Duration Flow Tracking (BDFT) system and method of the invention track the duration of packet flows by measuring the time between the first and the last packets of a flow. For example, the BDFT method may use the TCP SYN, FIN and RST packets; it is to be noted that the invention is applicable to other types of flows, in which case the packets of similar functionality are used. The ensuing description refers to TCP flows by way of example.

Figure 1:
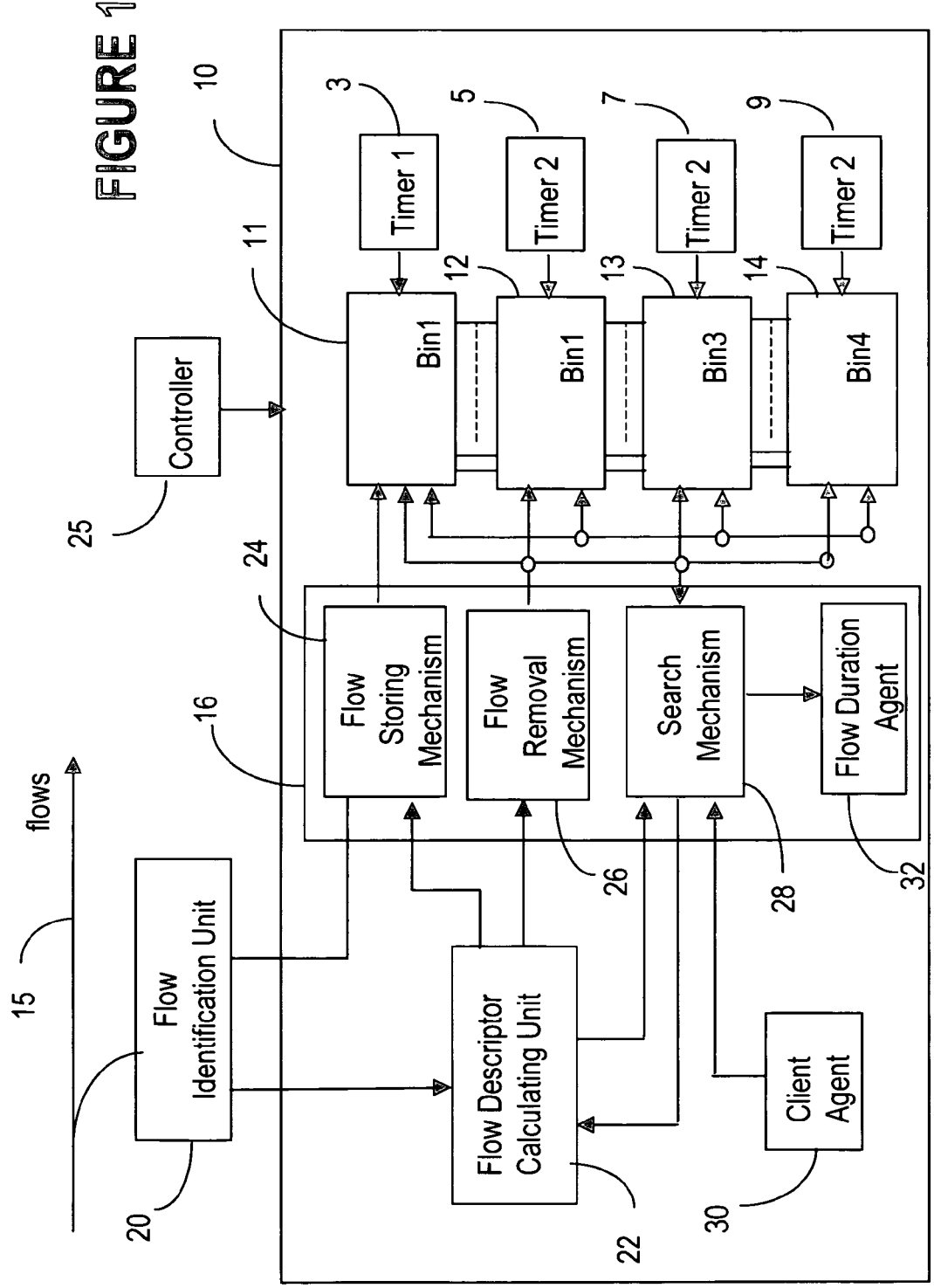
FIG. 1 illustrates a block diagram of the system for tracking flows duration according to an embodiment of the invention.

FIG. 1 illustrates a block diagram of the BDFT system according to an embodiment of the invention. A traffic flow, as the flow denoted with 15 in FIG. 1, uses a BDFT unit 10 which receives SYN, FIN, RST packets pertinent to that flow from a flow identification unit 20.

Flow identification unit 20 shows generically selection of the SYN, FIN and/or RST packets from the network traffic and distributes the SYN, FIN, RST packets to unit 10. Block 20 can be implemented in several ways, depending on the design of the network element where the flow duration measurement takes place. A simple software module can be used to test the TCP flags field, or a hardware based solution could use a content addressable memory (CAM) to detect these packets, etc. Flow selection is implemented based on address data extracted from certain fields of the respective TCP packet header. Preferably, address data includes the source and destination address fields, which distinguish the flows.

BDFT unit 10 includes a flow descriptor calculating unit 22, a plurality of bins 11-14, and a bin access interface 16. The address data from the SYN packets is used by the flow descriptor calculating unit 21 to generate a flow descriptor. For example, the descriptor may be calculated based on the packet source and destination IP addresses, source and destination ports and a protocol number (unless only TCP flows are tracked, then the protocol number can be ignored). The flow descriptors are unique to each flow.

The flow descriptor is then stored in bins 11-14, etc, each bin being characterized by a time range (duration), generically illustrated by timers 3, 5, 7, and 9. Each bin covers an independent and arbitrary length of time, from a "youngest" bin (e.g. a bin 3 covers 0-15 seconds) to an "oldest" bin (e.g. bin 14 covers 75-135 seconds). The bins cover consecutive ranges of time, so that in this example the bins can measure flow durations between 0 and 135 seconds.

A trivial option to accomplish the invention would be to use fixed length tables as bins, with each table entry holding all of the information for a flow. However this would require large amounts of memory, and result in slow searching. To meet the resource constraints present in a router more efficient data structures must be used. The invention uses counting Bloom filters for storing the flows descriptors. However, the invention is not restricted to use of counting Bloom filters; it is possible that higher performance could be achieved from the use of other data structures such as Space Code Bloom Filters.

An empty Bloom filter is a bit array of m bits, all set to 0. Bloom filters use also k different hash functions, each of which maps a key value to one of the m array positions. In order to add an "element" to the bin, the element has to be fed to each of the k hash functions, to get k array positions in the filter and the bits in these positions are set to 1. To test whether an element is a member of the set (to querry an element), the element is again fed to each of the k hash functions to get k array positions. If all of the bits at these positions are zero, the element is not in the set—if it were, then all the bits would have been incremented when it was inserted. If all elements in these k positions are not zero, then either the element is in the set, or the bits have been set during the insertion of other elements.

Implementing the bins with Bloom filters has several advantages. The use of Bloom filters reduces the memory requirements of storing the flows from directly proportional to the number of flows, to constant, and so it is easy to place a cap on the total memory used. Bloom filters also allow memory to be used far more efficiently by storing both the flow identification information and the duration of the flow as just a few bits. In addition, Bloom filters can store the information in a very condensed form.

The system of the invention implements the bins as counting Bloom filters, where each location is a counter consisting of a small number of bits. The size of the bloom filters, range of the count, and number of hashes used are all parameters of the method, which affect memory usage, processing required, and accuracy, as described later. It is to be noted that FIG. 1 shows 4 bins only; the number of bins and their range depends on the particular implementation of the BDFT.

When counting Bloom filters are used, flow descriptor calculating unit 22 applies k hashes to data from the packet header of the TCP SYN, FIN or RST packets. Once the flow hashes are calculated, unit 22 identifies which counters of a respective bin are involved in the flow duration assessment process.

There are four main operations performed on the bins at bin access interface 16, namely adding flows to bins, aging the bins, searching bins for flows and removing flows from bins.

Adding, searching and removing flows from the bin are performed using the flow descriptor, and more precisely the set of counters identified by the flow descriptor calculating unit 22.

Flows are added in a bin when they are established, namely when the response SYN packet is sent for the case of a TCP flow, using flow storing mechanism 24. Each flow is added once, and flows which are never established are not added. Adding a flow involves calculating the flow descriptor and storing it in the youngest bin. For counting Bloom filters, flow storing mechanism 24 accesses the counters in the set identified by unit 22 and increments their value.

However, before adding the flow into the youngest bin, a search is performed on the younger bin to determine if the flow is not already in, since there can be a variable (random) number of SYN packets per flow. The search is performed using a search mechanism 28. It is recommended to use filtering of the packets, as described later, to detect only required SYN packets. Also, it is possible when adding a flow to a counting bloom filter that one or more counters are already at their maximum value. In this case counters which are at the maximum value are left at the maximum, and all other counters are incremented.

Since each bin corresponds to a time range, they must be periodically aged (expired). Aging is the process of keeping track of the duration of flows. A bin controller 25 identifies the bins for which the timer 3, 5, 7, 9 has expired, and "ages" the respective bin by moving the flow descriptor from the expired bin in the next bin (i.e. the bin with the consecutive time range). Depending on the implementation of the bins this may mean individually copying flows to the next bin, or simply updating a pointer to each bin.

Flows are removed from a bin in which they reside currently when the first FIN or RST packet is sent. Removal of a flow involves calculating again the hashes based on the address data in the FIN or RST packet in unit 22, and searching for the flow descriptor starting with the oldest bin. Once the descriptor is located in a certain bin, a flow removal mechanism 26 confirms that the relevant counters are greater than or equal to one, and if so, it decrements the respective counters. This may result in some flows being removed prematurely. To avoid premature removal of the flows, the FIN and RST packets may be filtered over a short time interval, as described later. If the relevant counters are zero, it means that the flow has already been removed, or that the packet is a fake.

If the flow descriptor is found in a bin, a flow duration agent 32 translates the range of time corresponding to the bin number into an average value, which is returned to a requestor agent (not shown) as the flow duration. For example, if the flow is in a 45-75 sec bin, a flow duration of 60 sec is returned by block 32. If the flow is not found, the returned flow duration value is 0. Optionally, when a flow ends, a notification could be sent to an external agent.

FIG. 1 also shows a client agent 30 that may request a bin search for establishing the duration of a certain flow. In such a case, the search mechanism requests unit 22 to calculate the flow descriptor, and then the search mechanism performs a search, starting with the oldest bin, to locate the flow of interest. This functionality may for example be necessary if the client agent wishes to identify a flow that looks suspicious, etc.

Figure 2:
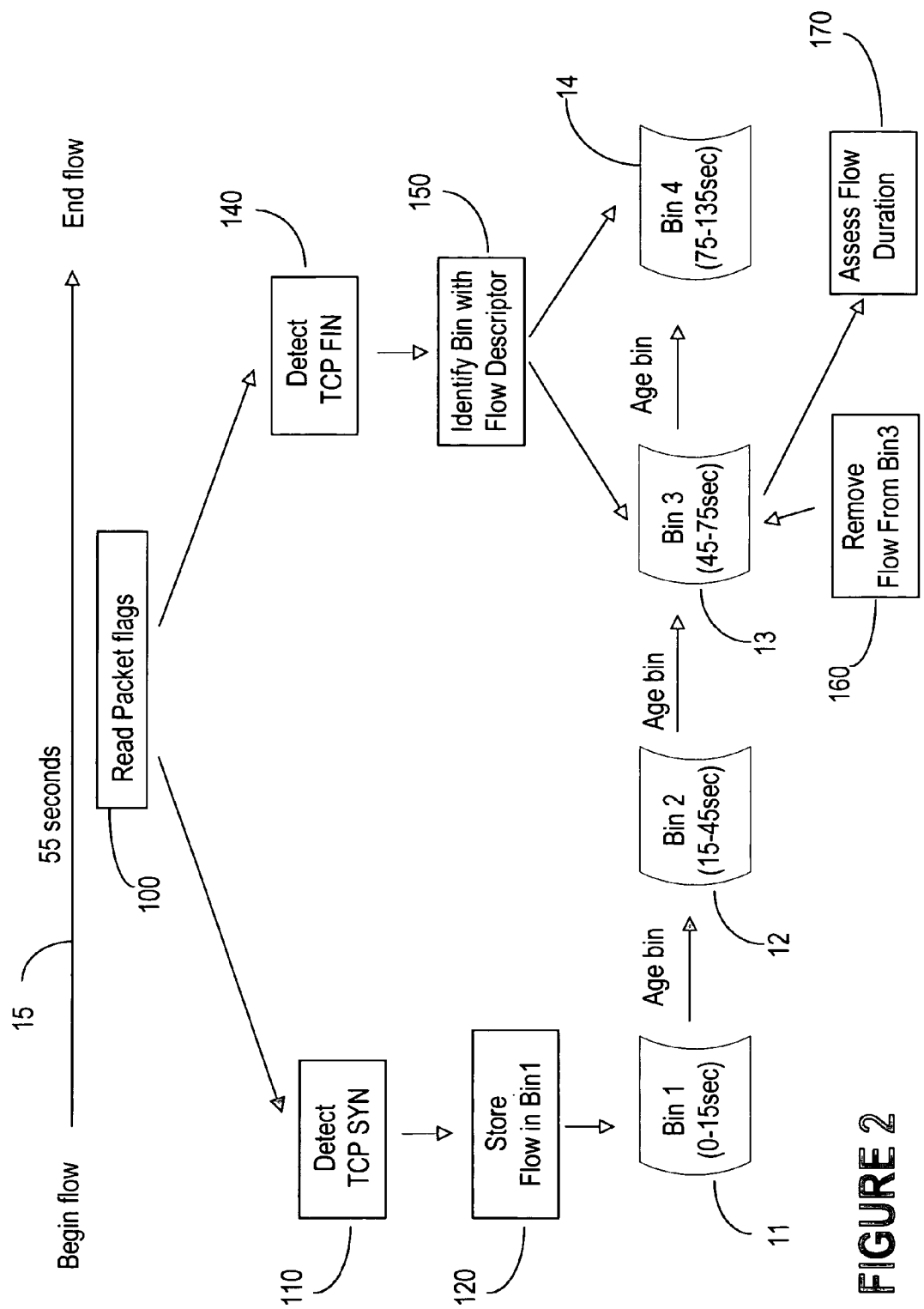
FIG. 2 shows schematically the flow chart of the BDFT method according to the invention.

BDFT method, shown in FIG. 2, is comprised two main processes executed in parallel, independently from each other. A first process deals with flow adding and removal to, and respectively from, the bins. The second process deals with the progress a flow through the bins, also referred as "aging the bins. The example of FIG. 2 uses again four bins 11, 12, 13 and 14 for a flow 15, each bin being a counting Bloom filter, where bin 1, denoted with 11, has a length of 0 to 15 seconds, bin 2, denoted with 12, has a length of 15 to 45 seconds, bin 3, denoted with 13, has a length of 45 to 75 seconds, and bin 4, denoted with 14, has a length of 75 to 135 seconds.

When the first SYN packet is received, as shown at 100, the system calculates the flow descriptor by applying k hashes to the address data from the SYN packet, in order to get the k array positions (counters) in the filter, as shown in step 110. Adding (storing) the flow, shown in step 120 involves first searching to determine if the flow descriptor is in the bin. If not, the flow descriptor is added in the "youngest" bin, which is bin 11 in the example of FIG. 2. This means that the counters of bin 11 corresponding to the positions determined in step 110 are incremented. If the flow is already in a bin, (this is possible since a flow may carry more than one SYN packet), the counters are not incremented.

Figure 3:
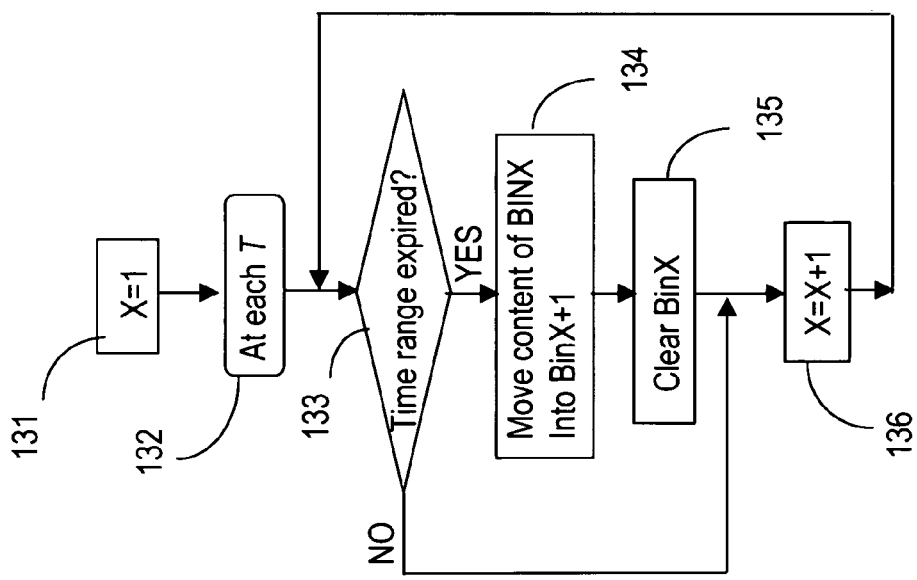
FIG. 3 shows a flow chart of the process of aging (expiring) the bins.

The "younger" bin 11 keeps the flow descriptor until the bin time range expires (i.e. the bin expires), at which time the flow descriptor is moved in the next "older" bin. For example, bin 11 ages each 15 seconds, at which time the flow descriptor is "moved" from bin 11 to bin 12; the flow descriptor is again moved into bin 13 when bin 12 expires after 45 seconds form the beginning of the flow 15. This aging process is shown in FIG. 3 and described later in further details.

When the first FIN or RST packet for flow 15 is detected in step 140, the system calculates again the k hashes to obtain the k array positions in the filter based on the address data calculated from the FIN packet. Then, bins are searched (queried) for identifying the descriptor, as shown at step 150. The query process starts from the last bin (the "oldest") for that flow, here bin 14, and then continues with the next younger bin, etc., until the descriptor is found. When the flow descriptor is located, the counters of the respective bin are decremented for removing the flow from the bin, as shown at step 160.

When the system is queried for the duration of a flow 15 by an external agent 32 (see FIG. 1), it returns the bin number which the flow descriptor has been found, which is then translated into time range. In the example of FIG. 2, the descriptor was located in Bin3 which has a range of 45-75 seconds, and the flow duration is assessed at less than 75 seconds, or at about 60 seconds.

As indicated above, the process of expiring bins or "aging" runs in parallel with the flow storing and removal process described above, and in the background. FIG. 3 shows the progress of a flow through the bins from detection of a first SYN packet until detection of a first FIN/RST. The bin aging process is involves periodically checking the bin timers, starting with a first bin (X=1, step 131), at regular intervals of time T, (step 132). Time T should be less than the length of the shortest bin, which is 15 seconds in the example of FIG. 2. If the first bin has not expired, branch "No" of decision block 133, bin index X is incremented by 1, step 136, and the system checks the status of the next bin, bin 2. Once the first bin expires, branch "Yes" of decision block 133, the contents of this expired bin is moved into the next bin Bin X+1, step 134 and the expired bin BinX is cleared, step 135. Moving the content of a bin to the next may be performed for example by updating a pointer.

The time range covered by each bin is a parameter that can be adjusted according to the traffic type. Because each bin covers a range of time there is some inaccuracy inherent in the binning process, and exact times for each flow are not maintained. In practice this means that the bins are arranged with younger bins covering less time (1 min), and older bins covering more time (15 min), so the relative inaccuracy involved in the binning process is kept to a minimum. For example, a flow that is 11 minutes and 25 seconds old would be in a bin with a range such as 10:00-12:00, giving an average age of 11 minutes for flows in this bin, and leading to an error of 25 seconds for this flow. As indicated above the flow duration times are not exact, reported durations can be off by 10%, but this is still a very good result, having in view the advantages of the method (on-line, real-time, simple, no data processing, etc).

Table 1 below provides examples of time ranges (the length of bins) and bin sizes (number of entries). The counter size can for example be 0-7 bits.

TABLE 1

| Time Range R (min:sec) | Bin Size |
|---|---|
| 0-15 | 524288 |
| 15-45 | 262144 |
| 45-1:15 | 131072 |
| 1:15-2:15 | 131072 |
| 2:15-3:15 | 131072 |
| 3:15-4:15 | 65536 |
| 4:15-6:15 | 65536 |
| 6:15-8:15 | 65536 |
| 8:15-10:15 | 65536 |
| 10:15-14:15 | 32768 |
| 14:15-18:15 | 32768 |
| 18:15-22:15 | 32768 |
| 22:15-30:15 | 32768 |
| 30:15-38:15 | 32768 |
| 38:15-46:15 | 32768 |
| 46:15-60:00 | 32768 |

The accuracy of the BDFT method is discussed next in connection with experimental results. Adding a flow can fail if the counters in Bin 1 for that flow have reached their maximum value. Removing a flow from a bin can fail if the flow descriptor is not found. Both cases of errors when adding and removing a flow can be ignored, resulting in a minor loss in accuracy.

The method according to the invention described above processes every SYN, FIN and RST packet to achieve the best accuracy. Ideally, the counters are incremented (SYN) and decremented (FIN/RST) once per flow. By analyzing packet traces it was determined that a SYN/FIN/RST occurs every 1 in 20 packets. Filtering of the SYN, FIN, and RST packets may be used for optimizing the performance of BDFT method. However, since a SYN/FIN/RST packet accounts for 1 out of every 20 packets in normal Internet traffic, filtering the number of TCP SYN, FIN, and RST packets in this way, results in a sampling rate of 1:20, which is much higher than the traditional statistical flow monitoring systems. Such a high sampling rate could potentially exceed memory and backplane resources. Nonetheless, the effects of this high sampling rate is virtually counterbalanced by the fact that the BDFT method and system requires a sample of only few bytes per SYN/FIN/RST packet (e.g. 12 bytes for 3 hashes), versus a much larger number of bytes (e.g.128 bytes) necessary with some of the methods used currently. In addition, the BDFT samples can be aggregated to reduce backplane and processing overhead.

For example, a small 128 byte SRAM buffer can be used at unit 20 at the datapath level to buffer the BDFT samples; such a buffer can hold 10 samples. In effect buffering in this way reduces the sampling resources used by BDFT by a factor of 10, resulting in a sampling rate of 1:200. Larger buffers could be used to further reduce the rate. A 1200 byte buffer would reduce the sampling rate to 1:2000. Also note that hashes could also be reduced if required. For example, 24bits hashes may be used instead of 32 bits hashes, which results in a further reduction from 12 bytes for 3 hashes to 9 bytes.

Also, the Bloom filters do introduce some errors; there is the possibility to have "false positives", when hashes for a flow match the hashes of a different flow. "False negatives", are also possible if a flow's counters have been decremented that should not have been decremented. This can happen when counters for other flows overlap a single flow's counters and the single flow's counters are decremented twice. This will cause the overlapping flows to be partially removed, resulting in false negatives. The number of these errors can be mitigated by increasing the amount of memory allocated to the bin.

To keep the number of false positives low, the ratio of the active flows in a bin to the total possible flows must be kept low.

It is also to be noted that sizing of the bins has a dramatic effect on the performance of BDFT. Bins must be sized such that the cumulative error of searching through all of the bins is low. This means keeping the probability of a false positive error in one bin below about 0.2%. The error rate is balanced by the amount of memory required per bin. If the available memory is limited, the size of the bins can be reduced.

Figure 4:
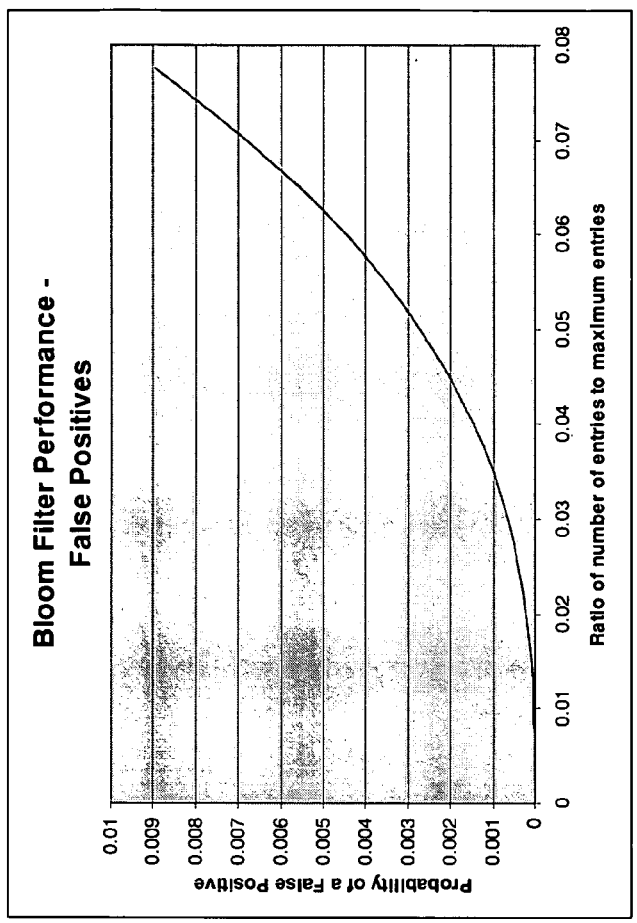
FIG. 4 illustrates bin sizing intrinsic error of searching one Bloom filter for the presence of a flow, based on how "full" the bin is.

FIG. 4 shows the intrinsic error of searching one bloom filter for the presence of a flow, based on how "full" the filter is. The abscissa of the graph shows the probability of false positives and the ordinate shows the ratio between the number of entries in the Boom filter to the total maximum entries. It is apparent on this graph that doubling the ratio from 2% to 4% results in an increase in per-bin errors from 0.01% to 0.144%. For good performance, the false positive probability should be kept below 0.1%. Also, since there are many more short flows than long ones, young bins must be much larger.

When adding a flow into a bin it is possible that the one or more of the counters is already at its maximum value, so incrementing it would lead to an overflow; in this case the counter must not be incremented. When an overflow occurs the longest duration flow that uses that counter will be lost. This occurs because the counter will be decremented each time one of the shorter duration flows expires, so the counter will reach 0 before the longer duration flow actually terminates.

Figure 5A:
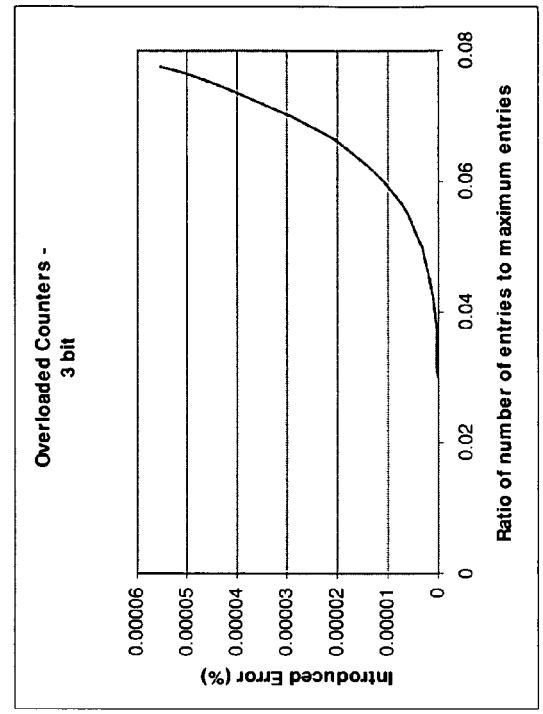
FIG. 5a shows an example of counter sizing guidelines for bins with 2-bit counters.
Figure 5B:
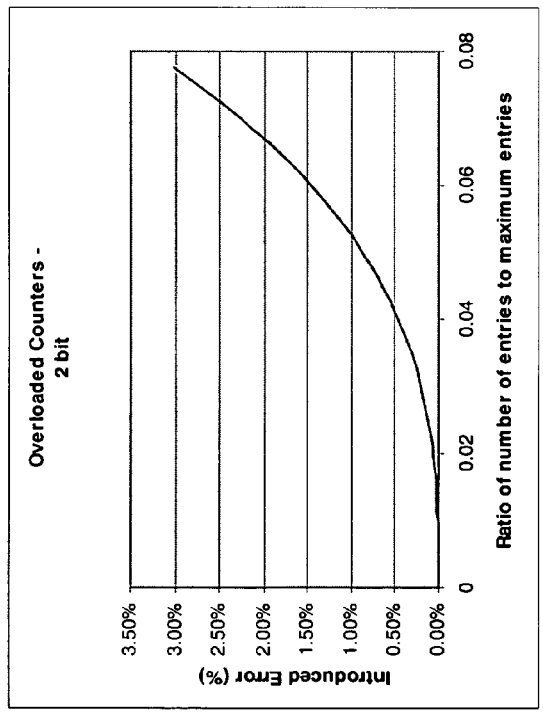
FIG. 5b shows an example of counter sizing guidelines for bins with 3-bit counters.

FIGS. 5a and 5b show the error introduced by counter overloads. It is to be noted that these errors disproportionately affect longer duration flows; in fact all errors shown in these graphs affect the longest duration flows. Since the purpose of BDFT is specifically to track the longer flows, counter overflow errors are serious. To avoid these errors 3-bit counters should be used, or the ratio of active flows to total entries should be kept below 5%.

The binned duration flow tracking (BDTF) method has been implemented and tested using a one hour long trace. BDFT is 99.2% accurate at determining flow durations down to 20 seconds for the one-hour trace.

I claim:

1. A system for measuring a duration of a packet flow of interest in a communication network, comprising:
   a flow descriptor unit for calculating a unique flow descriptor for said packet flow;
   a plurality of timers;
   a plurality of bins, each bin of the plurality of bins connected to a respective timer of the plurality of timers, the plurality of bins covering contiguous time ranges, each bin for keeping said unique flow descriptor until a respective time range expires;
   a bin access interface for storing said unique flow descriptor in a youngest bin on receipt of a flow beginning packet, and removing the unique flow descriptor from a current bin where said unique flow descriptor is currently located, on receipt of a flow ending packet; and a bin controller for moving the unique flow descriptor from a certain bin to a next, older bin when the respective timer for the certain bin has expired.

2. The system of claim 1, further comprising:
a flow duration agent for determining the duration of said packet flow based on the time range of said current bin.

3. The system of claim 1, further comprising:
a flow identification unit for detecting said flow beginning packet in said packet flow, and providing same to said flow descriptor unit.

4. The system of claim 1, wherein said flow descriptor unit determines said unique flow descriptor from address data extracted from any of said flow beginning packet and said flow ending packet.

5. The system of claim 1, wherein said bin access interface further comprises:
a search mechanism for locating said unique flow descriptor in one of said bins;
a flow storing mechanism for storing said unique flow descriptor in said youngest bin, once said search mechanism fails to locate said unique flow descriptor in said youngest bin, for ensuring that said unique flow descriptor is stored once; and
a flow removal mechanism for removing said unique flow descriptor from said current bin once said search mechanism has located said unique flow descriptor in said current bin.

6. The system of claim 1, wherein each said bin is a counting Bloom filter, where each element is a small count counter.

7. A method for measuring a duration of a packet flow of interest in a communication network, comprising:
calculating a unique flow descriptor from a flow beginning packet;
storing said unique flow descriptor into a youngest bin of a plurality of bins, covering contiguous time ranges, wherein each bin is connected to a respective timer;
progressing said unique flow descriptor through said bins from a current bin $Bin_X$ to a next bin $Bin_{X+1}$ as the respective timers for the bins expire; and
determining the duration of said packet flow based on an identifier X of a bin that currently stores said unique flow descriptor, wherein the identifier X initially has a value of 1.

8. A method for measuring a duration of a packet flow of interest in a communication network, comprising:
detecting a flow beginning packet indicating the beginning of said packet flow; and
calculating a unique flow descriptor for said packet flow;
storing said unique flow descriptor in a youngest bin of a plurality of bins, covering contiguous time ranges, each bin connected to a respective timer and keeping said unique flow descriptor until the respective timer expires;
moving the unique flow descriptor from a younger bin to a next, older bin when the respective timer for said younger bin expires;
removing the unique flow descriptor from a current bin where said unique flow descriptor is currently located, on receipt of a flow ending packet; and
determining the duration of said packet flow based on the time range of said current bin.

9. The method of claim 8, wherein the detecting step further comprises:
extracting address data and protocol type data from said flow beginning packet; and
calculating said unique flow descriptor from said address data and protocol type data.

10. The method of claim 8, wherein said bins are counting Bloom filters, with m array positions, where each array position is a small count counter.

11. The method of claim 10, wherein the detecting step further comprises, for a TCP packet flow:
detecting a TCP SYN packet in said packet flow by accessing a SYN flag bit in the packets of said TCP packet flow;
extracting address data from said TCP SYN packet; and
applying k different hashes to said address data for obtaining m key values and mapping each key value to one of the m small count counters of said youngest bin for identifying a set of small count counters corresponding to said unique flow descriptor.

12. The method of claim 11, wherein the storing step further comprises:
incrementing the small count counters of said set in said youngest bin if they do not already store said unique flow descriptor.

13. The method of claim 11, wherein the moving step further comprises:
checking a status of each bin at regular intervals of time, T, in sequence starting with said youngest bin; and
if a bin BinX that stores currently the unique flow descriptor has expired, transferring said unique flow descriptor from said bin BinX to the next, older bin BinX+1.

14. The method of claim 13, wherein transferring said unique flow descriptor from said bin BinX to the next, older bin BinX+1 is performed by one of copying said unique flow descriptor to the next, older bin and updating a pointer to each bin.

15. The method of claim 13, wherein T is less than a length of the shortest bin.

16. The method of claim 11, wherein the removing step further comprises:
detecting a TCP FIN packet in said packet flow by accessing a FIN flag bit in the packets of said packet flow;
extracting address data from said TCP FIN packet;
applying k different hashes to said address data for obtaining m key values;
mapping each key value to one of the m small count counters of an oldest bin of said plurality of bins for identifying a set of small count counters corresponding to said unique flow descriptor;
determining if said unique flow descriptor is in said oldest bin by checking a count in said set of small count counters;
if said unique flow descriptor is not in said oldest bin, repeating the mapping and determining steps for a next younger bin, until said current bin holding said unique flow descriptor is located.

17. The method of claim 11, wherein step e) further comprises:
estimating the duration of said packet flow as being less than an upper range of said current bin.

18. The method of claim 11, wherein step e) further comprises:
estimating the duration of said packet flow as an average between lower and upper ranges of said current bin.

19. The method of claim 8, wherein younger bins cover less time than older bins, so relative inaccuracy is kept to a minimum.

20. The method of claim 16, further comprising:
filtering said TCP SYN and TCP FIN packets.

* * * * *